I. K. BROWNING.
MILKING MACHINE.
APPLICATION FILED JULY 28, 1913.
1,116,379.
Patented Nov. 10, 1914.
2 SHEETS—SHEET 1.
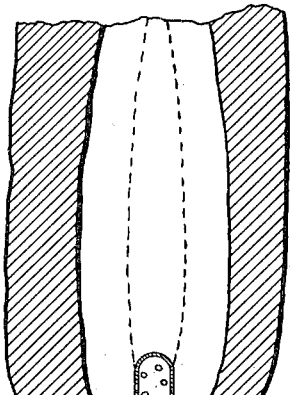
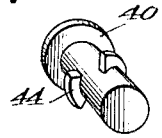
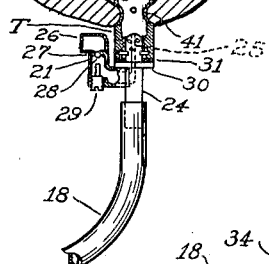
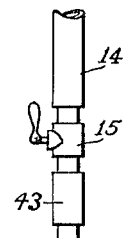
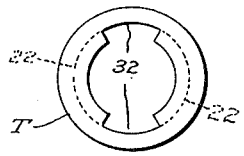
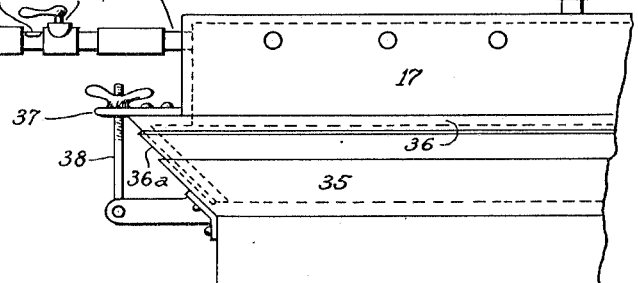
WITNESSES:
INVENTOR
Irving K. Browning
BY
W. W. Boughton
ATTORNEY

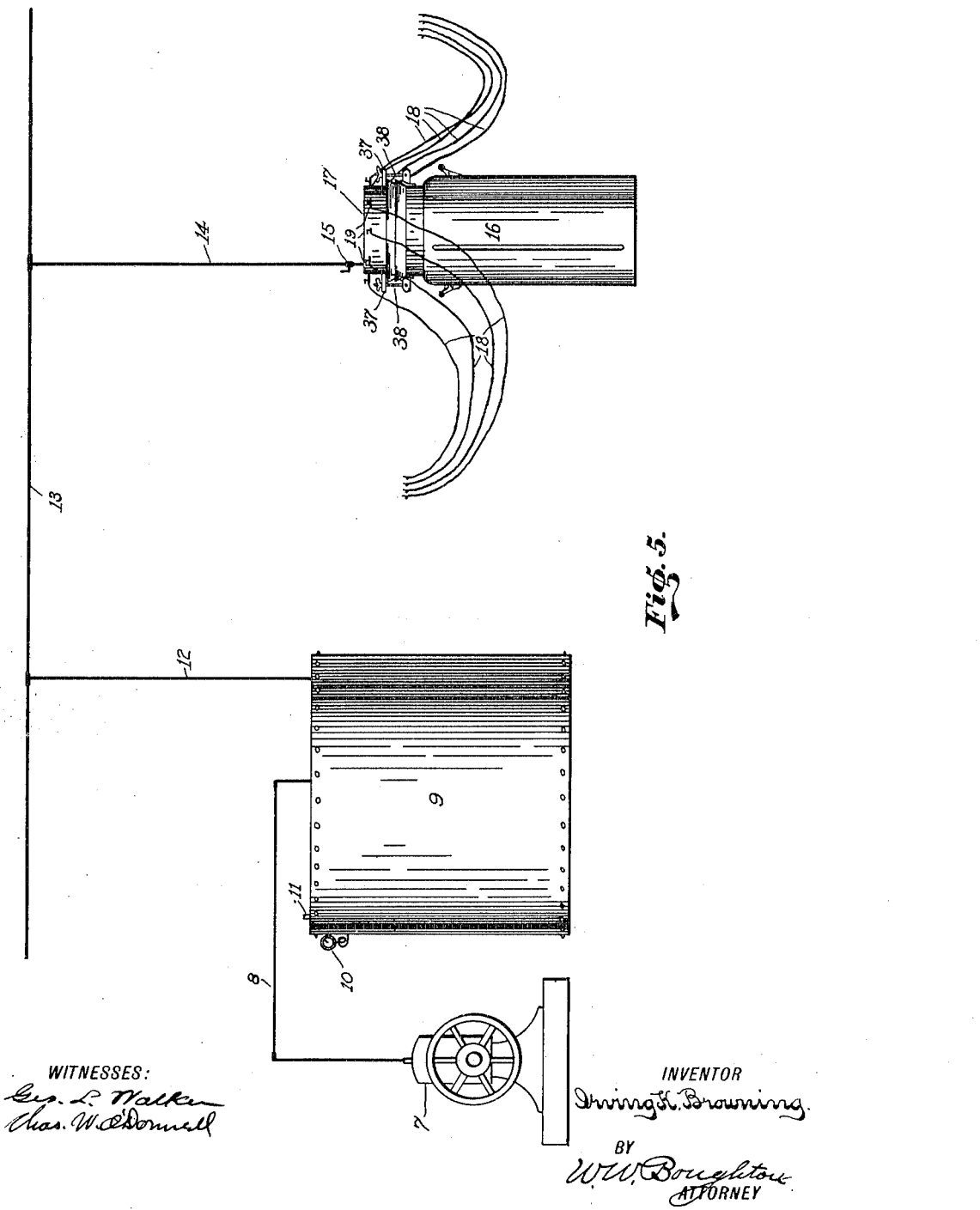

UNITED STATES PATENT OFFICE.

IRVING K. BROWNING, OF LAMAR, COLORADO.

MILKING-MACHINE.

1,116,379.  Specification of Letters Patent.  Patented Nov. 10, 1914.

Application filed July 28, 1913. Serial No. 781,575.

*To all whom it may concern:*

Be it known that I, IRVING K. BROWNING, a citizen of the United States, and a resident of Lamar, in the county of Prowers and State of Colorado, have invented a certain new and useful Improvement in Milking-Machines, of which the following is a full, clear, and exact description.

The principal object of this invention is the provision of a practical milking machine which shall operate upon the interior of the teat; and also to so construct the device that it will operate under lower vacuum conditions than other machines—to the end that irritation and discomfort to the animal shall be avoided.

Broadly speaking, the invention comprises the use of perforated tubes T which are allowed to remain in the teats and devices adapted to be connected to the perforated tubes at milking time, which latter devices shall operate to withdraw the milk and deliver it into suitable receptacles.

Further objects and advantages of my invention will later appear in the specification and be pointed out in the appended claims.

In the two sheets of drawings accompanying this application and forming a part hereof Figure 1 is a central transverse section, on a slightly enlarged scale, of a cow's teat, disclosing a central transverse section of the perforated tube *in situ* and a portion of the coöperating parts in position, the latter parts being shown partially in section and partially in elevation; Fig. 2 is a perspective, on a still larger scale, showing the perforated insert which coöperates with the perforated tube, the air inlet valve, and a portion of the connecting tube; Fig. 3 is a perspective view of the closure cap for the perforated tube; Fig. 4 is a partial side view of the milk receptacle and the closure cap therefor, a portion of the vacuum tube and of one of the milking tubes being shown; Fig. 5 is a diagrammatic view illustrating the arrangement of the plant; Fig. 6 is an end view of the perforated tube, on an enlarged scale; and Fig. 7 is an elevation of the inlet end of the air valve, on an enlarged scale.

Referring to Fig. 5, the numeral 7 indicates any suitable vacuum producing means, connected by a pipe 8 with the vacuum chamber 9. This chamber is provided with a vacuum gage 10 and an air inlet valve 11, which valve serves to equalize the exhaustion in the vacuum chamber 9 and may be set to admit air at any predetermined drop in pressure. These devices being of common design I have not illustrated them in detail. A pipe 12 connects the vacuum chamber 9 with a pipe 13, which latter extends the length of the stable. At suitable points along the pipe 13, depending flexible tubes 14 are provided, these tubes having valves 15 which serve to close them when not in use.

The arrangement of milk receptacles which I prefer employs one can 16 for each two cows—the can being placed between the cows and the closure 17 therefor being provided with eight milking tubes, four for each cow. The milking tubes 18 are preferably connected to the periphery of the closure 17 and are each provided with independent valves 19, permitting of any tube being made inoperative in case a cow has less than four teats, or when the milk has been extracted from one teat in advance of the others, as will be more fully explained later.

To the outer ends of the tubes 18 are attached the means for drawing milk from the perforated tubes T. These means comprise the perforated insert 20, the float-operated air-admitting valve 21, liquid tight gasketing means 30, 31, cam shaped securing means 23, and an extension 24 forming means for connecting these parts to the pipe 18. The perforated insert 20 is shown as being substantially dome-shaped in form, slightly smaller in diameter than the interior dimensions of the tube T and provided with perforations 20$^a$ which are preferably less in aggregate area than the aggregate area of the perforations in the tube T and substantially equal in aggregate area to the area of the passage 25, which has its mouth in the highest part of the insert 20, above said openings 20$^a$. The air admission valve is located in a chamber 21 projecting from the side of the extension 24 and a small passage 25 extends from the chamber upwardly through the surface of the insert 20 as above described. The valve chamber proper is shown as being substantially double-L shaped with the ends extending in opposite directions, though this form is not an essential part of my invention. The outer end of the valve chamber is preferably covered by a screen 26 and a perforated diaphragm 27 in the valve chamber 21 is adapted to be closed by a floating ball 28. A tap screw 29 is placed in the lower part of the chamber to close the opening through which the ball has been introduced. A shoulder 30 on the extension 24 is located in position to form a seat for the gasket 31 and force it into engagement with the lower end of the tube T. The means for securing the parts described in this paragraph to the tube T comprise a pair of inclined cam surfaces 23, formed as lugs on the insert 20, which cam surfaces enter the cut out portions 32 in the tube T (see Fig. 6) and draw the gasket 31 to its seat by engagement with the surfaces of the slots 22 indicated in dotted lines in Fig. 6, when the insert is turned after being introduced into the tube T. I prefer to place in each tube 18 a transparent portion 34, preferably of glass, which will permit the operator to see when the flow of milk through any tube has ceased; when this occurs the valve 18 should be shut off, thus stopping the suction action on that tube.

The milk receptacles 16 are provided with a flaring mouth 35 in which the lower part 36 of the closure 17 makes an air tight fit against the gasket 36ª. Ears 37 on the closure are in position to be engaged by pivoted thumb-screw bolts 38 on the milk receptacle and when the thumb-screws are tightened the closure is forced tightly home.

The tubes T should be made of silver, or other suitable non-corrodible metal, in order that there may be no tendency to poison the teats or the milk. A closure 40 having cams 44 thereon similar to cams 23 is provided for the tubes T, and these closures are removed at the time of milking and clean ones replaced after milking is over. The tubes T are slightly smaller in external diameter at the point 41 where they are engaged by the lip of the teat and so are readily held in place. I have found by trial that these tubes do not annoy the animal nor produce any irritation of the parts. In fact as will be later pointed out, this system of milking has a decided therapeutic value in case there is a tendency to milk fever.

Operation: Assuming the parts to be disconnected, as they would be, for instance, for purposes of cleansing, the closures 17 are attached to the tubes 14 by means of the connections 43, and the milking tubes 18 joined to the closure 17 by the connections 42. The receptacles 16 are then placed in position below the closures and secured thereto by the bolts 38. The caps 40 having been removed from the tubes T, the inserts are quickly inserted and locked in place by giving them a slight turn, the tubes T projecting sufficiently far from the teats to enable them to be grasped by the thumb and fore finger for this purpose. In most instances there will be a tendency for the milk to flow out through the air inlet valve but this is prevented by the ball 28 floating into position against the opening in the diaphragm 27. The valve 15 and the several valves 19 are opened and the vacuum produced through the tube 14 will cause the milk to be gently drawn out through the inserts 20 and the tubes 18 to the receptacles 16. I prefer to employ a vacuum of about four pounds, though I do not wish to limit myself to any particular degree of vacuum. The aggregate area of the openings in the insert 20 should preferably be less than the aggregate area of the perforations in the tube T in order that so long as there is considerable milk in the udder such milk may be fed to the tubes substantially by its gravity and may tend to feed faster than it can be drawn off. Thus at this stage practically no suction will be exerted on the walls of the teat. As the milking progresses and the supply from the udder is not up to the capacity of the openings in the insert 20 some air will be drawn into the inserts 20 through the air inlet valve 21, the ball 28 falling away to free the opening in the diaphragm 27, and this serves to prevent too great suction being exerted upon the teat and the drawing of the walls of the teat into the perforations of the tube T and the possible rupture of said walls. When the milking operation is about complete a considerable air will thus be drawn in and this action, aside from being an aid as described in the milking operation, is also of material value in reducing any tendency toward inflammation. When any teat is stripped this will be indicated to the operator by the absence of any milk passing through the transparent tube section 34 and the valve 19 leading to this particular tube should then be closed. After the milking is complete the inserts 20 are withdrawn by giving them a slight turn and clean caps 40 are inserted in the tubes T. The tubes T should be of such length as only to project a sufficient degree to enable them to be grasped by the fingers as described, for if they are longer there will be danger of their being caught by weeds or underbrush with resulting injury to the animal. In very cold weather the air entering through the screen 26 should be warmed to prevent freezing of the milk but under ordinary temperature conditions this is not necessary.

Having thus described my invention, what I claim and desire to secure by Letters Patent is:

1. In a milking machine, a perforated tube adapted to enter a teat and be allowed to remain therein, and easily detachable means for exerting suction on said tube.

2. In a milking machine, a non-corrodible, perforated tube adapted to enter a teat and be allowed to remain therein, and easily detachable means for exerting suction on said tube.

3. In a milking machine, a perforated tube adapted to enter a teat, perforated means adapted to close the lower end of said tube, and means for exerting suction on said closing means.

4. In a milking machine, a perforated tube adapted to enter a teat and be allowed to remain therein, a hollow, perforated insert adapted to enter said tube and be secured therein, and means for exerting suction on said insert.

5. In a milking machine, an open ended perforated tube adapted to enter a teat and be allowed to remain therein, a hollow, perforated insert adapted to enter said tube and carrying means for tightly closing the open end of said perforated tube, and means for exerting suction on said insert.

6. In a milking machine, a perforated tube adapted to enter a teat, a hollow insert within said tube having perforations therein of less aggregate area than those in said tube, and means for exerting suction on said insert.

7. In a milking machine, a perforated tube adapted to enter a teat, means for exerting suction on said tube, and means for admitting air to the interior of said tube.

8. In a milking machine, a perforated tube adapted to enter a teat, a hollow, perforated insert within said tube, an air inlet valve communicating with said tube through a passage in said insert, and means for exerting suction on said insert.

9. In a milking machine, a perforated tube adapted to enter a teat, a hollow, perforated insert within said tube, an air inlet pipe communicating with said tube, the area of said pipe and of the perforations in said insert being substantially equal, and means for exerting suction on said insert.

10. In a milking machine, a perforated tube adapted to enter a teat, means for exerting suction on said tube, and restricted means for admitting air to the interior of said tube.

11. In a milking machine, a perforated tube adapted to enter a teat, a hollow, perforated insert within said tube, a float operated air inlet valve communicating with said tube through a passage in said insert, and means for exerting suction on said insert.

12. In a milking machine, a milk receptacle, vacuum producing means connected to said receptacle, a perforated tube adapted to enter each teat and be allowed to remain therein, a perforated, hollow insert adapted to enter and be detachably secured to said perforated tube, and a milking tube connected to each insert and to the milk receptacle.

13. In a milking machine, a milk receptacle, vacuum producing means connected to said receptacle, a perforated tube adapted to enter each teat and be allowed to remain therein, a hollow, perforated insert adapted to enter and be detachably secured to said perforated tube, an air inlet valve communicating with said tube through a passage in said insert, and a milking tube connected to each insert and to the milk receptacle.

In testimony whereof, I have hereunto affixed my signature in the presence of two witnesses.

IRVING K. BROWNING.

Witnesses:
    Charles W. O'Donnell,
    Chas. H. Williams.